United States Patent
Lanier et al.

(10) Patent No.: US 9,922,463 B2
(45) Date of Patent: Mar. 20, 2018

(54) VIRTUALLY VISUALIZING ENERGY

(71) Applicant: Microsoft Technology Licensing, LLC, Redmond, WA (US)

(72) Inventors: Jaron Lanier, Sausalito, CA (US); Kishore Rathinavel, Chapel Hill, NC (US); Nikunj Raghuvanshi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 248 days.

(21) Appl. No.: 14/821,632

(22) Filed: Aug. 7, 2015

(65) Prior Publication Data

US 2017/0039767 A1    Feb. 9, 2017

(51) Int. Cl.

| | |
|---|---|
| *G06T 15/00* | (2011.01) |
| *G06T 19/00* | (2011.01) |
| *G02B 27/01* | (2006.01) |
| *G06T 11/20* | (2006.01) |
| *G06F 3/01* | (2006.01) |
| *G09B 23/06* | (2006.01) |

(52) U.S. Cl.
CPC .......... *G06T 19/006* (2013.01); *G02B 27/017* (2013.01); *G06F 3/011* (2013.01); *G06T 11/20* (2013.01); *G09B 23/06* (2013.01); *G02B 2027/0178* (2013.01)

(58) Field of Classification Search
None
See application file for complete search history.

(56) References Cited

U.S. PATENT DOCUMENTS

| | | |
|---|---|---|
| 5,189,463 A | 2/1993 | Capper et al. |
| 7,039,676 B1 | 5/2006 | Day et al. |
| 7,626,569 B2 | 12/2009 | Lanier |
| 7,725,547 B2 | 5/2010 | Albertson et al. |

(Continued)

FOREIGN PATENT DOCUMENTS

| | | |
|---|---|---|
| CN | 103941861 | 7/2014 |
| KR | 20140001167 | 1/2014 |
| KR | 20140010616 | 1/2014 |

OTHER PUBLICATIONS

PCT/US2016/043220—ISR/WO dated Nov. 8, 2016, 16 pages.

(Continued)

*Primary Examiner* — Andrew G Yang
(74) *Attorney, Agent, or Firm* — Jacob P. Rohwer; Newport IP, LLC (57) ABSTRACT

The techniques describe herein use sensor(s) to scan a real-world environment and obtain data associated with geometry of the real-world environment that affects how energy propagates (e.g., locations of spatial objects in a room). The sensor(s) also detect energy (e.g., sound) in the real-world environment, from which a location of a source of the energy can be determined. The techniques combine the geometry data and the energy data to determine how the detected energy propagates from the location of the source through the real-world environment. The techniques can then cause a representation of the propagating energy to be displayed, to a user, as virtual content via a mixed reality device. Accordingly, a user is able to see energy that is otherwise invisible.

20 Claims, 6 Drawing Sheets

(56) References Cited

U.S. PATENT DOCUMENTS

| | | | |
|---|---|---|---|
| 8,231,465 B2 | 7/2012 | Yee et al. | |
| 8,294,557 B1 | 10/2012 | El Saddik et al. | |
| 8,421,823 B2 | 4/2013 | Nishikawa | |
| 8,520,027 B2 | 8/2013 | Itkowitz et al. | |
| 8,612,363 B2 | 12/2013 | Karkanias et al. | |
| 8,687,021 B2 | 4/2014 | Bathiche et al. | |
| 9,063,566 B2 | 6/2015 | McCulloch et al. | |
| 2005/0148828 A1 | 7/2005 | Lindsay | |
| 2008/0001951 A1 | 1/2008 | Marks et al. | |
| 2010/0020083 A1 | 1/2010 | Kumakura | |
| 2010/0060662 A1 | 3/2010 | Law | |
| 2010/0103196 A1 | 4/2010 | Kumar et al. | |
| 2010/0146395 A1 | 6/2010 | Reyes et al. | |
| 2010/0253700 A1 | 10/2010 | Bergeron | |
| 2010/0267451 A1 | 10/2010 | Kawano | |
| 2011/0221656 A1 | 9/2011 | Haddick et al. | |
| 2012/0069028 A1 | 3/2012 | Bouguerra | |
| 2012/0231883 A1 | 9/2012 | Hayashi | |
| 2013/0042296 A1 | 2/2013 | Hastings | |
| 2013/0044129 A1 | 2/2013 | Latta et al. | |
| 2013/0044130 A1 | 2/2013 | Geisner et al. | |
| 2013/0093788 A1 | 4/2013 | Liu et al. | |
| 2013/0120372 A1 | 5/2013 | Lee et al. | |
| 2013/0147788 A1 | 6/2013 | Weise et al. | |
| 2013/0155105 A1 | 6/2013 | Boldyrev et al. | |
| 2013/0169682 A1 | 7/2013 | Novak | |
| 2013/0174213 A1 | 7/2013 | Liu et al. | |
| 2013/0293468 A1 | 11/2013 | Perez et al. | |
| 2013/0307875 A1 | 11/2013 | Anderson | |
| 2013/0342564 A1 | 12/2013 | Kinnebrew et al. | |
| 2013/0342636 A1 | 12/2013 | Tian | |
| 2014/0002492 A1 | 1/2014 | Lamb et al. | |
| 2014/0082520 A1 | 3/2014 | Mamoun | |
| 2014/0125698 A1 | 5/2014 | Latta et al. | |
| 2014/0160001 A1 | 6/2014 | Kinnebrew et al. | |
| 2014/0204077 A1 | 7/2014 | Kamuda et al. | |
| 2014/0226900 A1 | 8/2014 | Saban et al. | |
| 2014/0240351 A1 | 8/2014 | Scavezze et al. | |
| 2014/0354685 A1 | 12/2014 | Lazarow et al. | |
| 2014/0359085 A1 | 12/2014 | Chen | |
| 2014/0368537 A1 | 12/2014 | Salter et al. | |
| 2015/0104061 A1 | 4/2015 | Heikkinen et al. | |
| 2015/0153912 A1 | 6/2015 | Reily et al. | |
| 2015/0170419 A1 | 6/2015 | Ohashi | |
| 2015/0294506 A1* | 10/2015 | Bare | G06T 19/006 345/633 |
| 2015/0302654 A1* | 10/2015 | Arbouzov | G06T 19/006 345/633 |
| 2016/0035135 A1 | 2/2016 | Park | |
| 2016/0078657 A1* | 3/2016 | McCord | G06T 11/206 345/440 |
| 2017/0038829 A1 | 2/2017 | Lanier et al. | |
| 2017/0039770 A1 | 2/2017 | Lanier et al. | |

OTHER PUBLICATIONS

Bertram, M., et al. "Phonon Tracing for Auralization and Visualization of Sound", IEEE, Minneapolis, MN, Oct. 23-28, 2005, pp. 151-158.

Tapio, L, et al., "Immersive Visualization of Room Acoustics", Nov. 10, 2006, 7 pages.

Loy Rodas, N., et al., Seeing is Believing: Increasing Intraoperative Awareness to Scattered Radiation in Interventional Procedures by Combining Augmented Reality, Monte Carlo Simulations and Wireless Dosimeters, International Journal of Computer Assisted Radiology and Surgery, Springer, DE, Feb. 2015, pp. 1181-1191.

Kita, Yui, et al., "Thermal Visualization on Cooking", 2013 23rd International Conference on Artificial Reality and Telexistense (ICAT), Dec. 11, 2013, pp. 92-96.

D.W.F. Van Krevelen, et al., "A Survey of Augmented Reality Technologies, Applications and Limitations", The International Journal of Virtual Reality, Jan. 1, 2010, pp. 1-20.

Ballagas, et al., "Family Communication Phone Conversations with Children", In Proceedings of the 8th International Conference on Interaction Design and Children, Jun. 3, 2009, pp. 321-324, 4 pages.

Dias, et al., "Image Manipulation Through Gestures", In Proceedings of Advances in Computer Graphics, Nov. 2004, 8 pages.

Dove, Jackie, "Personify Lets You Video Chat, Watch Movies or Play Games in an Immersive 3D Virtual Space", Published Jan. 13, 2015, 8 pages.

Jung, et al., "Touched by the Storyteller the Influence of Remote Touch in the Context of Storytelling", In Proceedings of Humaine Association Conference on Affective Computing and Intelligent Interaction, Sep. 2, 2013, 6 pages.

Kadav, et al, "Improving the Online Video Chat Experience", In Proceedings of International Conference on Ergonomics and Health Aspects of Work with Computers as Part of Human-Computer Interaction, Jul. 9, 2011, 2 pages.

PCT/US2016/043219—International Search Report and Written Opinion, dated Oct. 5, 2016, 14 pages.

Pirzadeh, et al.,"Designing Multi-Touch Gestures to Support Emotional Expression in IM", In Proceedings of Extended Abstracts on Human Factors in Computing Systems, Apr. 26, 2014, 6 pages.

Yarosh, et al., "Almost Touching Parent Child Remote Communication Using the ShareTable System", In Proceedings of Conference on Computer Supported Cooperative Work, Feb. 23, 2012, 12 pages.

Strauss, et al., "Linking between real and virtual spaces", Published on: Jul. 1999 Available at: http://cid.nada.kth.se/pdf/cid_90.pdf, 110 Pages.

"Augmented Reality in Education", In Proceedings of the "Science Center to Go" Workshops, Oct. 27, 2011, 86 pages.

Billinghurst, et al., "Collaborative Mixed Reality", In Proceedings of the International Symposium on Mixed Reality, Mar. 19, 1999, 14 pages.

Branscombe, Mary, "Microsoft HoloLens is a World-Changing Mixed Reality Product", Retrieved on: Jul. 31, 2015, Available at: http://www.in.techradar.com/reviews/wearables/Microsoft-HoloLens/articleshow/45992974.cms, 9 pages.

Canon Technology, "Searching for Seeds of Technology Research in Pre-Competitive Areas", retrieved on Aug. 3, 2015, Available at: http://www.canon.com/technology/approach/special/pre.html, May 7, 2013, 3 pages.

Chan, "What the World Would Look Like If You Could Actually See Wi-Fi Signals", Available at: http://gizmodo.com/what-the-world-would-look-like-if-you-could-actually-se-846030448, Jul. 30, 2013, 10 pages.

"Collaborative Mixed Reality", Published on: Oct. 12, 2014, Available at: https://web.cs.dal.ca/-reilly/inspace.html, 3 pages.

"Holographic Computing is here", Retrieved on: Jul. 28, 2015 Available at: https://www.microsoft.com/microsoft-hololens/en-us, 8 pages.

Kunert, et al., "Photoportals: Shared References in Space and Time", In Proceedings of the 17th ACM Conference on Computer Supported Cooperative Work & Social Computing, Feb. 15, 2014, pp. 1388-1399.

Lifton, et al., "Dual Reality: Merging the Real and Virtual", In Proceedings of International Conference on Facets of Virtual Environments, Jul. 27, 2009, pp. 1-16.

Mathews, et al., "Are You There? Active Attention for Person Tracking in Mixed Reality Environments", In Proceedings of the 10th Annual International Workshop on Presence, Oct. 25, 2007, pp. 321-327.

Neal, "Here's What Wi-Fi Would Look Like If We Could See It", retrieved on Aug. 3, 2015, Available at: http://motherboard.vice.com/blog/this-is-what-wi-fi-would-look-like-if-we-could-see-it, Jul. 22, 2013, 4 pages.

Reality Media Lab, "Gr.4 Constructing the Advanced Mixed Reality Space Using Audio-Visual Senses", retrieved on: Jul. 31, 2015, Available at: http://www.rm.is.ritsumei.ac.jp/english/g4.html, 3 pages.

Regenbrecht, et al., "Interaction in a Collaborative Augmented Reality Environment", In Proceedings of Conference on Human Factors in Computing Systems, Apr. 20, 2002, pp. 504-505.

(56) References Cited

OTHER PUBLICATIONS

Reilly, et al., "SecSpace: Prototyping Usable Privacy and Security for Mixed Reality Collaborative Environments", In Proceedings of the Symposium on Engineering Interactive Computing Systems, Jun. 17, 2014, pp. 273-282.
Sargaana, et al., "Collaborative billiARds: Towards the Ultimate Gaming Experience", In Proceedings of 4th International Conference on Entertainment Computing, Sep. 19, 2005, pp. 361-371.
Sokol, "WiFi Visualization Lets Us See the Ghostly Waves that Surround Us", retrieved on Aug. 3, 2015, available at: <<http://iq.intel.com/visualizing-the-ghostly-wifi-waves-that-surround-us/>>, Jun. 26, 2014, 9 pages.
Sotiriou, et al., "Visualizing the Invisible: The Connect Approach for Teaching Science", In Proceedings of Sixth International Conference on Advanced Learning Technologies, Jul. 5, 2006, 3 pages.
Tan, et al., "The Best of Two Worlds: Merging Virtual and Real for Face to Face Collaboration", In Proceedings of the Workshop on Shared Environments to Support Face-to-Face Collaboration, Dec. 2000, 5 pages.
The Blueprint, "An Interview with Helen Papagiannis", retrieved on Aug. 5, 2015, Available at: https://theblueprint.com/stories/helen-papagiannis/, Nov. 12, 2014, 21 pages.
Zhang, et al., "Capturing Images with Sparse Informational Pixels using Projected 30 Tags", In the Proceedings of the IEEE Conference on Virtual Reality , Mar. 2008, pp. 11-18.
U.S. Appl. No. 14/821,505, Non Final Office Action dated Feb. 10, 2017, 28 pages.
Canon Technology, "Searching for Seeds of Technology Research in Pre-Competitive Areas", retrieved on Aug. 3, 2015, available at <<http://www.canon.com/technology/approach/special/pre.html>>, May 7, 2013, 3 pages.
Chan, "What the World Would Look Like If You Could Actually See Wi-Fi Signals", available at: <<http://gizmodo.com/what-the-world-would-look-like-if-you-could-actually-se-846030448>>, Jul. 30, 2013, 10 pages.
"Collaborative Mixed Reality", Published on: Oct. 12, 2014, Available at: https://web.cs.dal.ca/~reilly/inspace.html, 3 pages.
Neal Meghan, "Here's What Wi-Fi Would Look Like If We Could See It", retrieved on Aug. 3, 2015, available at: <<http://motherboard.vice.com/blog/this-is-what-wi-fi-would-look-like-if-we-could-see-it>>, Jul. 22, 2013, 4 pages.
Reality Media Lab, "Gr.4 Constructing the Advanced Mixed Reality Space Using Audio-Visual Senses", retrieved on: Jul. 31, 2015, available at: http://www.rm.is.ritsumei.ac.jp/english/g4.html>, 3 pages.
Sokol, Zach, "WiFi Visualization Lets Us See the Ghostly Waves that Surround Us", retrieved on Aug. 3, 2015, available at: <<http://ig.intel.com/visualizing-the-ghostly-wifi-waves-that-surround-us/>>, Jun. 26, 2014, 9 pages.
The Blueprint, "An Interview with Helen Papagiannis", retrieved on Aug. 5, 2015, available at <<https://theblueprint.com/stories/helen-papagiannis/>>, Nov. 12, 2014, 21 pages.
Zhang, et al., "Capturing Images with Sparse Informational Pixels using Projected 3D Tags", In the Proceedings of the IEEE Conference on Virtual Reality , Mar. 2008, pp. 11-18.
Ballagas, et al., "Family communication phone conversations with children", In Proceedings of the 8th International Conference on Interaction Design and Children, Jun. 3, 2009, pp. 321-324.
Dias, et al., "Image Manipulation through Gestures", In Proceedings of Advances in Computer Graphics, Nov. 2004, 9 pages.
Dove, Jackie, "Personify lets you Video Chat, Watch Movies or Play Games in an Immersive 3D Virtual Space", Published on: Jan. 13, 2015, Available at: http://thenextweb.com/apps/2015/01/13/personify-lets-video-chat-watch-movies-play-games-immersive-3d-virtual-space/.
Jung, et al., "Touched by the storyteller the influence of remote touch in the context of storytelling", In Proceedings of Humaine Association Conference on Affective Computing and Intelligent Interaction, Sep. 2, 2013, pp. 792-797.
Kadav, et al., "Improving the Online Video Chat Experience", In Proceedings of International Conference on Ergonomics and Health Aspects of Work with Computers as Part of Human-Computer Interaction, Jul. 9, 2011, 2 pages.
Pirzadeh, et al., "Designing Multi-Touch Gestures to Support Emotional Expression in IM", In Proceedings of Extended Abstracts on Human Factors in Computing Systems, Apr. 26, 2014, pp. 2515-2520.
PCT/US2016/043221—ISR and WO dated Sep. 28, 2016, 10 pages.
PCT/US2016/043226—ISR and WO dated Oct. 25, 2016, 12 pages.
U.S. Appl. No. 14/821,505, Final Office Action dated Aug. 17, 2017, 32 pages.

\* cited by examiner

```
┌─────────────────────────────────────────────────────────────┐
│ SCAN THE ENVIRONMENT TO DETERMINE SPATIAL OBJECTS AND/OR     │
│ BOUNDARIES THAT AFFECTS ENERGY PROPAGATION                   │
│ 502                                                          │
└─────────────────────────────────────────────────────────────┘
                              ↓
┌─────────────────────────────────────────────────────────────┐
│ COMPUTE GEOMETRY-BASED PROPERTIES BASED ON SCAN              │
│ 504                                                          │
└─────────────────────────────────────────────────────────────┘
                              ↓
┌─────────────────────────────────────────────────────────────┐
│ SENSE ENERGY AND/OR REPORT DATA ASSOCIATED WITH SENSED ENERGY│
│ 506                                                          │
└─────────────────────────────────────────────────────────────┘
                              ↓
┌─────────────────────────────────────────────────────────────┐
│ LOCATE SOURCE OF ENERGY WITHIN THE ENVIRONMENT               │
│ 508                                                          │
└─────────────────────────────────────────────────────────────┘
                              ↓
┌─────────────────────────────────────────────────────────────┐
│ USE GEOMETRY-BASED PROPERTIES TO COMPUTE A REPRESENTATION OF │
│ HOW THE SENSED ENERGY PROPAGATES FROM THE LOCATION OF THE    │
│ SOURCE OF THE ENERGY THROUGH THE ENVIRONMENT                 │
│ 510                                                          │
└─────────────────────────────────────────────────────────────┘
                              ↓
┌─────────────────────────────────────────────────────────────┐
│ VISUALIZE AND/OR RENDER REPRESENTATION OF HOW                │
│ THE SENSED ENERGY PROPAGATES                                 │
│ 512                                                          │
└─────────────────────────────────────────────────────────────┘
```

VIRTUALLY VISUALIZING ENERGY

BACKGROUND

Virtual reality is a technology that leverages computing devices to generate environments that simulate physical presence in physical, real-world scenes or imagined worlds (e.g., virtual scenes) via a display of a computing device. In virtual reality environments, social interaction can be achieved between computer-generated graphical representations of a user or the user's character (e.g., an avatar) in a computer-generated environment. Mixed reality is a technology that merges real and virtual worlds. Mixed reality is a technology that produces mixed reality environments where a physical, real-world person and/or objects in physical, real-world scenes can co-exist with a virtual, computer-generated person and/or objects in real time. For example, a mixed reality environment can augment a physical, real-world scene and/or a physical, real-world person with computer-generated graphics (e.g., a dog, a castle, etc.) in the physical, real-world scene.

SUMMARY

This disclosure describes techniques for enabling the use of sensor(s) to scan a real-world environment and obtain data associated with geometry of the real-world environment that affects how energy propagates (e.g., locations of spatial objects in a room). The sensor(s) can also detect energy (e.g., sound) in the real-world environment, from which a location of a source of the energy can be determined. The techniques combine the geometry data and the energy data to determine how the detected energy propagates from the location of the source through the real-world environment. The techniques can then cause a representation of the propagating energy to be displayed, to a user, as virtual content via a mixed reality device. Accordingly, a user is able to see energy that is otherwise invisible.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The techniques describe herein use sensor(s) to scan a real-world environment and obtain data associated with geometry of the real-world environment that affects how energy propagates (e.g., locations of spatial objects in a room). The sensor(s) also detect energy (e.g., sound) in the real-world environment, from which a location of a source can be determined. The techniques combine the geometry data and the energy data to determine how the detected energy propagates from the location of the source through the real-world environment. The techniques can then cause a representation of the propagating energy to be displayed, to a user, as virtual content via a mixed reality device.

For the purposes of this discussion, physical, real-world objects ("real objects") or physical, real-world people ("real people" and/or "real person") describe objects or people, respectively, that physically exist in a physical, real-world environment or scene ("real scene") associated with a mixed reality display. Real objects and/or real people can move in and out of a field of view based on movement patterns of the real objects and/or movement of a user and/or user device. Virtual, computer-generated content ("virtual content") can describe content that is generated by one or more computing devices to supplement the real scene in a user's field of view. In at least one example, virtual content can include one or more pixels each having a respective color or brightness, and the pixels are collectively presented on a display such to represent a person or an object that is not physically present in a real scene.

Moreover, as further discussed herein, the pixels can also represent energy that is physically present in a real scene but that typically cannot be seen by a user. For example, the energy being represented can include sound, as further described in some examples below. In addition, the techniques described herein can also be used to display dynamic volumetric visualization of Wi-Fi signals, heat, light, fluid dynamics, electro-magnetic fields, radiation, air currents, and other forms of energy that propagates through a three-dimensional space. In various implementations, a source of energy can be a real source (e.g., music playing, an actual burning fire, etc.). In alternative implementations, a source of energy can be a virtual source (e.g., the sound of a virtual balloon popping, heat from a virtual fire, etc.).

Illustrative Environments

Figure 1:
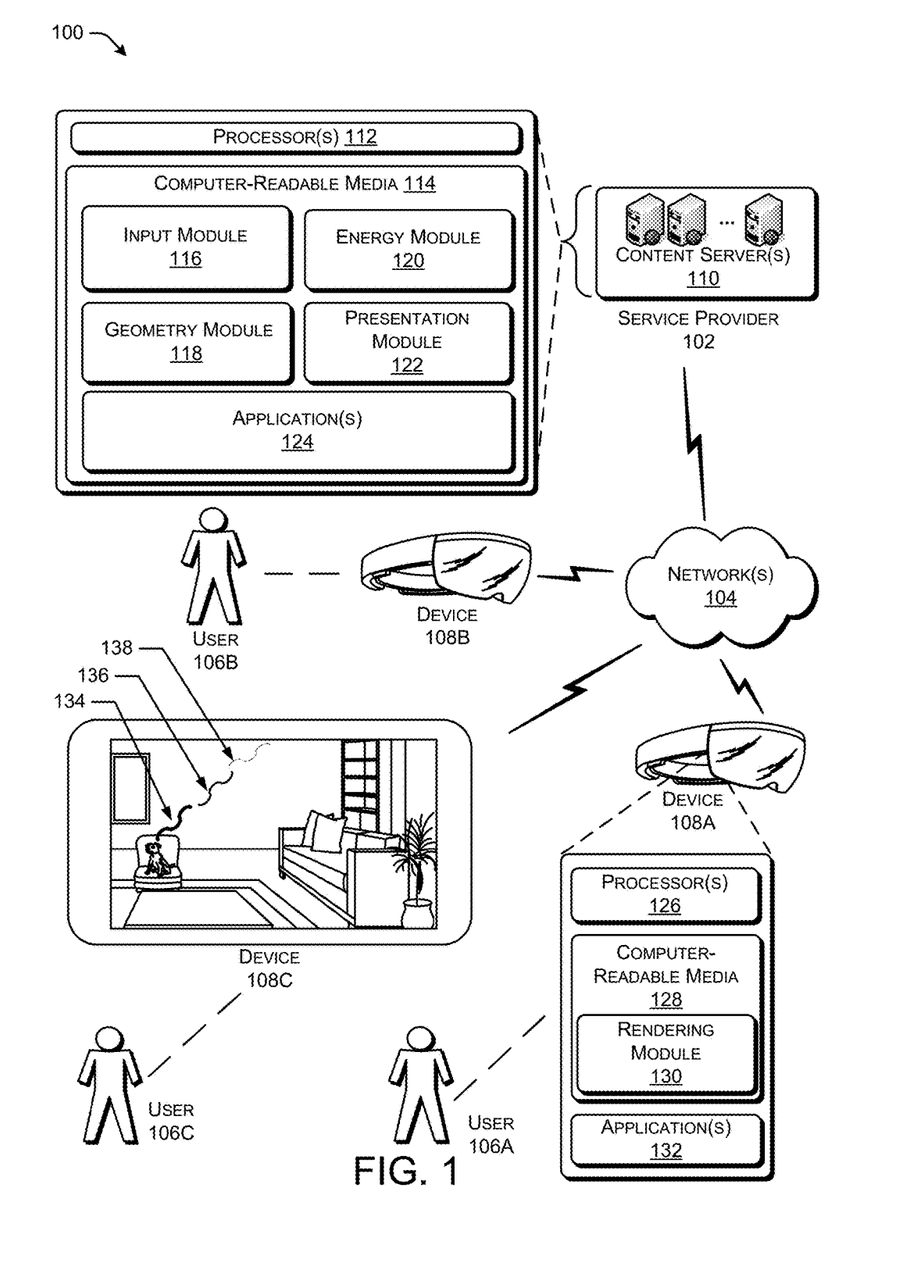
FIG. 1 is a schematic diagram showing an example environment in which invisible energy can be virtualized and viewed by a user in a mixed reality scene.

FIG. 1 is a schematic diagram showing an example environment 100 in which a user can see invisible energy within a mixed reality environment, or a mixed reality scene that includes real content (e.g., actual objects in a room) and virtual content (e.g., invisible energy). That is, a device associated with the user is configured to receive visualization data representative of the invisible energy and display the visualization data for the user to view. The visualization data can be displayed as virtual content to create, or contribute to, the mixed reality environment. For example, the visualization data can be presented via a display of the device as the user looks through the display (e.g., a transparent display) to view a physical, real-world scene.

The example environment 100 can include a service provider 102, one or more networks 104, one or more users 106 (e.g., user 106A, user 106B, user 106C) and one or more devices 108 (e.g., device 108A, device 108B, device 108C) associated with the one or more users 106. The service provider 102 can comprise any entity, server, platform, console, computer, etc., that enables individual users (e.g., user 106A, user 106B, user 106C) to visualize invisible energy in a mixed reality environment. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can receive data from one or more sensors. The data received from the sensors can be associated with (i) geometry of a physical, real-world environment (e.g., locations of spatial objects in a room) that affects how energy propagates and/or (ii) the energy (e.g., a location of the source within the room, an intensity or frequency of the energy, etc.). Based at least in part on receiving the data, the service provider 102 can determine how the sensed energy propagates from the location of the source through the physical, real-world environment based at least in part on the geometry, and then the service provider 102 can transmit data representative of the propagating energy to the various devices 108 so the data can be displayed, to a user, as virtual content in a mixed reality environment.

In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, etc.) and/or short range communications (e.g., Bluetooth, etc.). The networks 104 can facilitate communication between the server(s) 110 and the devices 108 associated with the users 106.

Examples of device(s) that can be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing devices.

Device(s) that can be included in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an input module 116, a geometry module 118, an energy module 120, a presentation module 122, and one or more applications 124, as well as other modules, programs, or applications that are loadable and executable by the processor(s) 112.

Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, an image camera, a depth sensor, a physiological sensor, a microphone or other acoustic sensor, a thermometer, a Geiger counter, and the like) and/or output peripheral devices (e.g., a display, a printer, audio speakers, a haptic output, and the like). Such network interface(s) can include one or more network interface controllers (NICs) or other types of transceiver devices to send and receive communications over a network.

Processing unit(s) (e.g., processor(s) 112) can represent, for example, a CPU-type processing unit, a GPU-type processing unit, an HPU-type processing unit, a Field-Programmable Gate Array (FPGA), another class of digital signal processor (DSP), or other hardware logic components that can, in some instances, be driven by a CPU. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate interaction between the service provider 102 and the one or more devices 108. The components can represent pieces of code executing on a computing device. In at least some examples, the modules can be executed as computer-readable instructions, various data structures, and so forth via at least one processing unit(s) (e.g., processor(s) 112) so the service provider 102 can determine how the sensed energy propagates from the location of the source through the physical, real-world environment based at least in part on the geometry (e.g., the sensed spatial objects in a room). Functionality to perform these operations can be included in multiple devices or a single device.

Depending on the configuration and type of the server(s) 110, the computer-readable media 114 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase-change memory, read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The input module 116 is configured to receive data from one or more input peripheral devices (e.g., a keyboard, a mouse, a pen, a game controller, a voice input device, a touch input device, a gestural input device, a tracking device, a mapping device, an image camera, a depth sensor, a physiological sensor, a microphone or other acoustic sensor, a thermometer, a Geiger counter, a color sensor, a gravity sensor and the like). In some examples, the one or more input peripheral devices can be integrated into the one or more server(s) 110 and/or other machines and/or devices 108. In other examples, the one or more input peripheral devices can be communicatively coupled to the one or more server(s) 110 and/or other machines and/or devices 108. For instance, the input peripheral devices can be distributed throughout a physical, real-world environment (e.g., placed at particular locations within a room in which a mixed reality scene is to be implemented). The one or more input peripheral devices can be associated with a single device (e.g., MICROSOFT® KINECT®, INTEL® Perceptual Computing SDK 2013, LEAP MOTION®, etc.) or separate devices.

The input module 116 is configured to receive data associated with geometry of a physical, real-world environment (e.g., a three-dimensional representation of a room). For example, the geometry can include mapped spatial real objects actually located in the physical, real-world environment (e.g., furniture, people, etc.) and/or defined boundaries of the physical, real-world environment (e.g., the walls of a room, the floor of the room, the ceiling of a room, etc.) outside of which objects may no longer be sensed. In various examples, some of the geometry can be stationary (e.g., fixed with little or no movement). Thus, the received data associated with the geometry of a physical, real-world environment can be obtained based on an initial environment scan, where the server(s) 110 instruct the peripheral input devices (e.g., sensors) to obtain data regarding the geometry of the physical, real-world environment. However, in other examples, at least some of the geometry can be dynamic (e.g., a spatial object may move within a room) and the data can be obtained based on instructions to perform scheduled or periodic scans over a period of time (e.g., every minute, every ten minutes, every hour, every day, etc.) to account for any changes and to update the geometry. In one example, a scan can be performed in real-time based on, or in response to, detected energy in a physical, real-world environment.

In various examples, based on the received data associated with geometry of a physical, real-world environment, the geometry module 118 is configured to compute energy-based geometry parameter fields. For instance, the geometry module 118 can compute parameter fields which encode scene level properties such as one or more of a loudness map (e.g., for sound propagation), a reflection map to model how energy is redirected in response to encountering a real or a virtual object, a reverberation map to model how repeated energy (e.g., an echo) propagates, an amount of time it takes energy to travel from a source location (e.g., a first three-dimensional point) in the real scene to another three-dimensional point within the real scene, etc. The energy-based geometry parameter fields can be used to determine how energy, detected at a particular location, propagates through the physical, real-world environment. For instance, for a sound source location, the geometry module 118 can compute a parameter field map which encodes how sound propagates in the three-dimensional space of a real scene, and thus, information regarding how loud the sound would be at different points in that space can be extracted based on the sound source location.

The input module 116 is further configured to receive data associated with energy (e.g., virtual or real) that is present in, or has been newly introduced to, the physical, real-world environment. The data associated with the energy can be indicative of: a location of a source that produces the energy (e.g., via the use of angles of detection), an intensity of the energy, and/or a frequency of the energy. In one example, an array of sensors can be used to localize energy (e.g., sound) by triangulating a source. That is, individual sensors or individual sensing devices distributed throughout the physical, real-world environment can report, to the input module 116, one or more of: an angle at which an energy source is detected, an intensity of the energy detected (e.g., an amplitude of sound), a time instance at which a sensor detects a signal, and/or a frequency spectrum of the energy detected (e.g., a frequency of the detected sound). In some instances, sensors or sensing devices can be co-located to triangulate an energy source. In one example, to perform triangulation on sound, at least three separate sensors or sensing devices with a microphone can be used to detect the sound so the sound can be localized. In at least one example, the triangulation can be solved by a least squares minimization approach, but other alternative approaches can also be used.

The energy module 120 is configured to combine the received data associated with the detected energy with the energy-based geometry parameter fields to determine how the energy propagates from the source location through the physical, real-world environment (e.g., how the energy interacts with the geometry of the physical, real-world environment). In some examples, the energy module 120 can also determine how the energy interacts with virtual objects in the physical, real-world environment, as well.

The presentation module 122 is configured to send rendering data to devices 108 for presenting virtual content (e.g., the detected energy and how it propagates through a mixed reality scene) via the devices 108. Accordingly, the presentation module 122 is configured to visualize the energy and provide the visualized energy to the devices 108 so the devices 108 can render and/or display the energy and the users 106 can view invisible energy in a mixed reality scene. For example, the presentation module 122 can visualize the energy so that a viewer can see the intensity of the energy, the frequency of the energy, the effects of the geometry on the energy and/or the time delay effects of the energy. In one example, the presentation module 122 uses a three-dimensional structure to represent the energy as a set (e.g., a three-dimensional array) of spheres distributed over the space of the physical, real-world environment (as shown in the "grid" of FIG. 4). For instance, perceptual parameters can be encoded based on the following: the size (e.g., radius) of a sphere indicates intensity (e.g., loudness) of the energy (e.g., spheres with a larger radius represent sound that is louder than the sound represented by spheres with a smaller radius), the color of a sphere indicates frequency of the energy (e.g., various frequencies or frequency ranges can be assigned different colors—red, green and blue) and the radius of the spheres can be modulated to show the effect of the geometry (e.g. the radius of the spheres decays as the distance from a particular sphere to the source increases).

In some instances, the energy can be visualized based on a perspective of a user within the physical, real-world environment. Consequently, a first user (e.g., user 106A) may visualize the energy differently than a second user (e.g., user 106B) because they are positioned at different locations within the physical, real-world environment. Therefore, the input module 116 can also be configured to receive data associated with positions and orientations of users 106 and their bodies in space (e.g., tracking data), so the locations of the user within the physical, real-world environment can be determined. Tracking devices can include optical tracking devices (e.g., VICON®, OPTITRACK®), magnetic tracking devices, acoustic tracking devices, gyroscopic tracking devices, mechanical tracking systems, depth cameras (e.g., KINECT®, INTEL® RealSense, etc.), inertial sensors (e.g., INTERSENSE®, XSENS, etc.), combinations of the foregoing, etc. The tracking devices can output streams of volumetric data, skeletal data, perspective data, etc. in substantially real time. The streams of volumetric data, skeletal data, perspective data, etc. can be received by the input module 116 in substantially real time. Volumetric data can correspond to a volume of space occupied by a body of a user. Skeletal data can correspond to data used to approximate a skeleton, in some examples, corresponding to a body of a user, and track the movement of the skeleton over time. Perspective data can correspond to data collected from two or more perspectives that can be used to determine an outline of a body of a user from a particular perspective. In some instances, combinations of the volumetric data, the skeletal data, and the perspective data can be used to determine body representations corresponding to users 106.

Applications (e.g., application(s) 124) can be created by programmers to fulfill specific tasks. For example, applications (e.g., application(s) 124) can provide utility, entertainment, and/or productivity functionalities to users 106 of devices 108 or other users. Example applications 124 that can use the techniques described herein include applications that use acoustics (e.g., music playing applications, game applications with sound effects, etc.), applications associated with energy efficiency (e.g., visualization of how heat spreads through a house), engineering applications (e.g., visualization of how strong a Wi-Fi signal is in a house), educational applications (e.g., that visualizes how radiation spreads), and so forth.

In some examples, the one or more users 106 can operate corresponding devices 108 to perform various functions associated with the devices 108. Device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the devices 108 can include mixed reality devices (e.g., CANON® MREAL® System, MICROSOFT® HOLOLENS®, etc.). Mixed reality devices can include one or more sensors and a mixed reality display, as described below in the context of FIG. 2. In FIG. 1, device 108A and device 108B are wearable computers (e.g., head mount devices); however, device 108A and/or device 108B can be any other device as described above. Similarly, in FIG. 1, device 108C is a mobile computer (e.g., a tablet device); however, device 108C can be any other device as described above.

Device(s) 108 can include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, an image camera, a depth sensor, a physiological sensor, a microphone or other acoustic sensor, a thermometer, a Geiger counter, a color sensor, a gravity sensor and the like) and/or output peripheral devices (e.g., a display, a printer, audio speakers, a haptic output, and the like).

Figure 2:
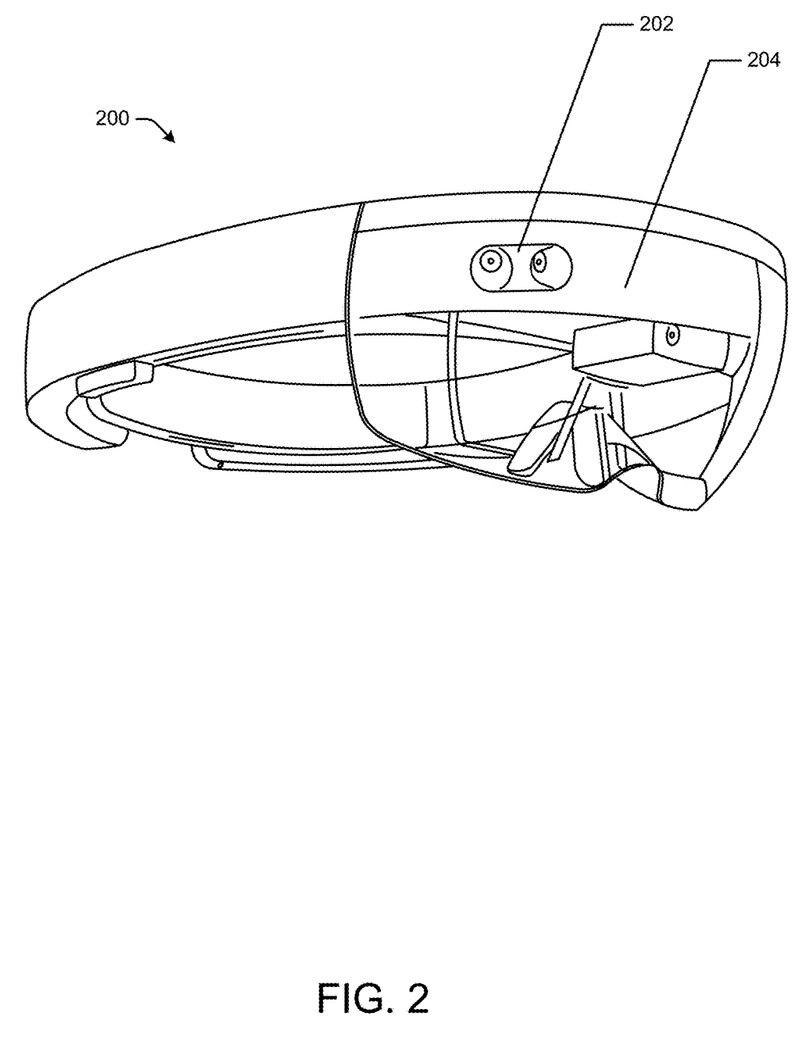
FIG. 2 is a schematic diagram showing an example of a head mounted mixed reality display device.

FIG. 2 is a schematic diagram showing an example of a head mounted mixed reality display device 200. As illustrated in FIG. 2, the head mounted mixed reality display device 200 can include one or more sensors 202 and a display 204. The one or more sensors 202 can include depth cameras and/or sensors, a microphone or other acoustic sensor to capture a voice, inertial sensors, optical sensors, body tracking sensors, etc. In some examples, as illustrated in FIG. 2, the one or more sensors 202 can be mounted on the head mounted mixed reality display device 200. The one or more sensors 202 correspond to inside-out sensing sensors; that is, sensors that capture information from a first person perspective. In additional or alternative examples, the one or more sensors can be external to the head mounted mixed reality display device 200 and/or devices 108. Such sensors 202 can also correspond to outside-in sensing sensors; that is, sensors that capture information from a third person perspective.

The display 204 can present visual content (e.g., energy) to the one or more users 106 in a mixed reality environment. In some examples, the display 204 can present the mixed reality environment to the user (e.g., user 106A, user 106B, or user 106C) in a spatial region that occupies an area that is substantially coextensive with a user's (e.g., user 106A, user 106B, or user 106C) actual field of vision. In other examples, the display 204 can present the mixed reality environment to the user (e.g., user 106A, user 106B, or user 106C) in a spatial region that occupies a lesser portion of a user's (e.g., user 106A, user 106B, or user 106C) actual field of vision. The display 204 can include a transparent display that enables a user to view the real scene where he or she is physically located. Transparent displays can include optical see-through displays where the user sees the real scene he or she is physically present in directly, video see-through displays where the user observes the real scene in a video image acquired from a mounted camera, etc. The display 204 can present the virtual content to a user such that the virtual content augments the physical, real-world scene where the user is physically located within the spatial region.

The devices 108 can include one or more processing unit(s) (e.g., processor(s) 126), computer-readable media 128, at least including a rendering module 130, and one or more applications 132. The one or more processing unit(s) (e.g., processor(s) 126) can represent same units and/or perform same functions as processor(s) 112, described above. Computer-readable media 128 can represent computer-readable media 114 as described above. Computer-readable media 128 can include components that facilitate interaction between the service provider 102 and the one or more devices 108. The rendering module 130 can receive rendering data (e.g., visual content such as energy) from the service provider 102 and can render virtual content on the display 204 of the device. In at least one example, the rendering module 130 can leverage one or more rendering algorithms for rendering virtual content on the display 204. Application(s) 132 can correspond to same applications as application(s) 124 or different applications.

FIG. 1 further illustrates how propagating energy can be displayed as virtual content to a user. For instance, user 106C may be viewing, through a display of device 108C, a physical, real-world environment that includes a dog sitting on a chair and barking in a living room of a house. As the sound of the barking propagates through the room away from the source (e.g., the dog), the sound decays. Accordingly, in this example, the virtual energy is represented by the presentation of a sound wave, and the virtual energy associated with element 134 is louder (e.g., as represented by a portion of the sound wave that is bolder) compared to the virtual energy associated with element 136, which represents sound that is further away from the source. Moreover, the virtual energy associated with element 136 is louder compared to the virtual energy associated with element 138, which represents sound that is even further away from the source. Accordingly, the virtual energy represented by elements 134, 136, and 138 illustrates an example of how a user 106C may view invisible energy within a physical, real-world scene.

An Example Mixed Reality User Interface

Figure 3:
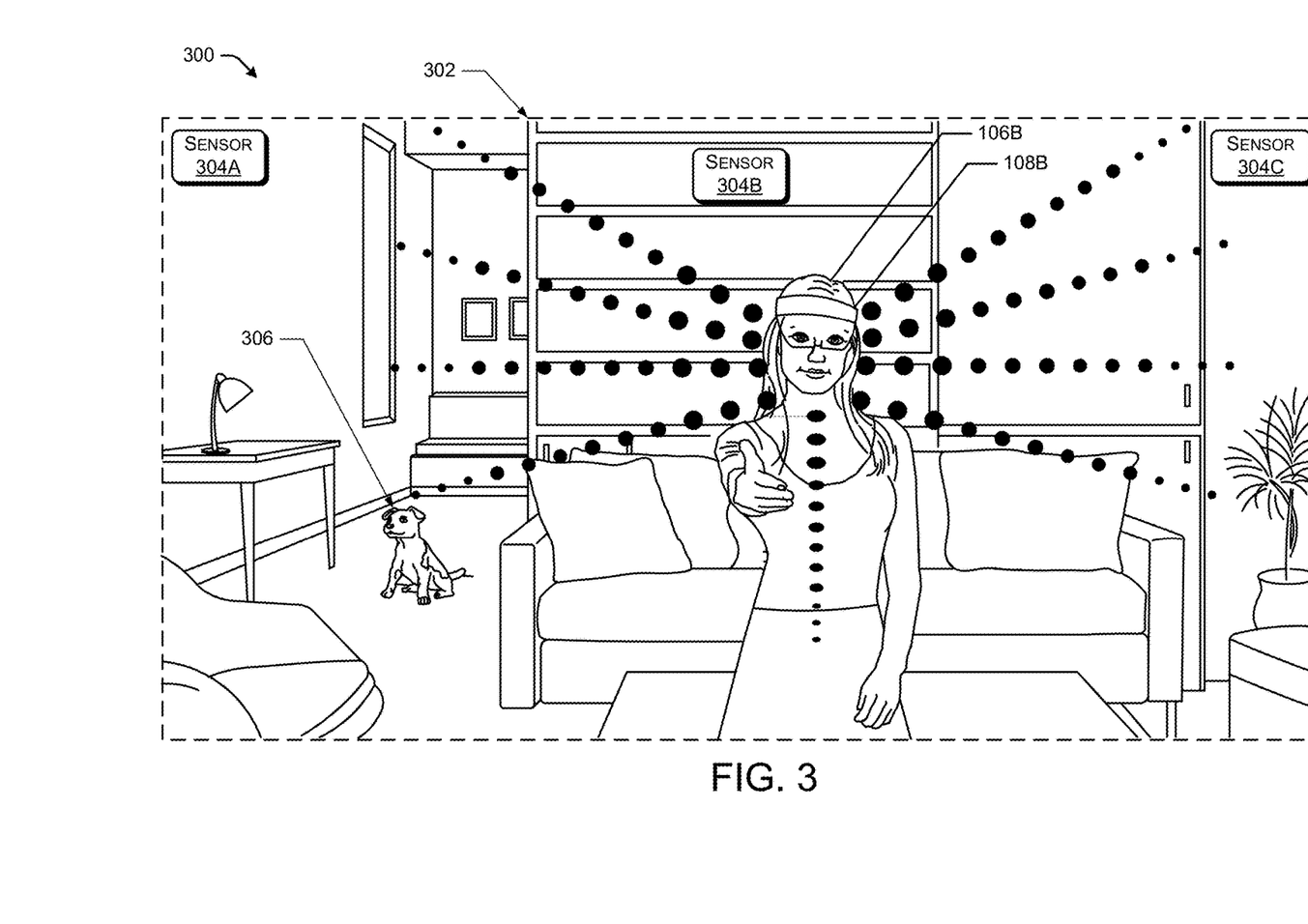
FIG. 3 is a schematic diagram showing an example of a first person view of virtual energy in a mixed reality scene.

FIG. 3 is a schematic diagram 300 showing an example of a first person view of a user (e.g., user 106A) listening to another user (e.g., user 106B) talk in a mixed reality environment. The area depicted in the dashed lines corresponds to a physical, real-world scene 302 in which at least the first user (e.g., user 106A) and the second user (e.g., user 106B) are physically present.

In FIG. 3, illustrates sensors 304A, 304B, 304C, which are each placed at a different location in the physical, real-world scene 302. As discussed above, the sensors 304A, 304B, 304C can be configured to scan the room and report data, to the input module 116 (which can be executed on a device in which one of the sensors 304A, 304B, 304C is integrated), related to the geometry of the room. Using the reported data, the geometry module 118 can then determine the shape and volumetric information associated with objects in the room (e.g., the couch, the chair, the table, the lamp, the bookshelf, etc.) and/or the overall space or size of the room based on detected boundaries (e.g., the floor, the walls, the ceiling, etc.). Moreover, the geometry module 118 can compute parameter fields which encode scene level properties, as discussed above. The sensors 304A, 304B, 304C can also be configured to detect energy in the room, and report data regarding the detected energy to the input module 116 so that the energy module 120 can combine the energy data with the geometry data and determine how the energy propagates through the room. The energy can then be rendered as a virtual visualization on a display (e.g., display 204) of a user device (e.g., device 200).

As shown in FIG. 3, user 106B may be talking with user 106A, and therefore, user 106A can see the sound of user's 106B voice as it propagates through the room via a display of a corresponding mixed reality device (e.g., device 108A). In this example, the sound is represented by spheres. A radius of an individual sphere represents intensity (e.g., loudness) of the sound at that particular three-dimensional point within the physical, real-world scene. Accordingly, the intensity of the sound decays as it propagates away from the source (e.g., the mouth of user 106B). For instance, a radius of a first sphere that is further away from the mouth of user 106B is smaller than a radius of a second sphere that is closer to the mouth of user 106B.

In some examples, a range of energy frequencies can be divided into bands (e.g., three bands) and an individual band can be assigned a color (e.g., red, green, blue). For instance, the current sound's spectrum can be converted into RGB values by having a direct relationship between the strength of frequencies in each band to the intensity of color they correspond to. This color information can then be superimposed on a map generated to represent wave propagation. Thus, in addition to seeing different sizes of spheres representing intensity (e.g., loudness), a map can also dynamically change color to indicate the current spectrum of sound.

The techniques described herein can also visualize, as virtual content, multiple different types of energy simultaneously. For example, if the dog 306 is barking while the user 106B is talking, the mixed reality scene can also display energy representing the sound of the dog's barking. In some instances, a second energy propagation can be represented a different shape (e.g., diamonds, squares, or waves—if spheres are already being used for the first energy propagation). Detecting multiple energy sources can be done using a blind source separation algorithm, for example. In noisy environments (with multiple sound sources), the energy module 120 can identify and select a particular sound source (e.g., for rendering as virtual content) based on a known energy signature of the source.

In various examples, the user 106A can see the original sound wave (e.g., represented by spheres) as it originates from a source and expands until the sound meets an obstacle such as furniture, walls, or floors. At this point, the sound can be reflected and the user 106A can see the reflected sound (e.g., a secondary or reflected sound wave). The secondary or reflected wave can then propagate until it meets an obstacle. This process of propagation and reflection can be visualized until the intensity of the sound is below a certain intensity threshold at which point the sound will no longer be displayed.

In various examples, the energy module 120 can be configured to artificially slow down the propagation of energy so that a user can view the energy. For instance, a timescale associated with the energy propagation can be distorted to match the human sensory and cognitive systems.

Figure 4:
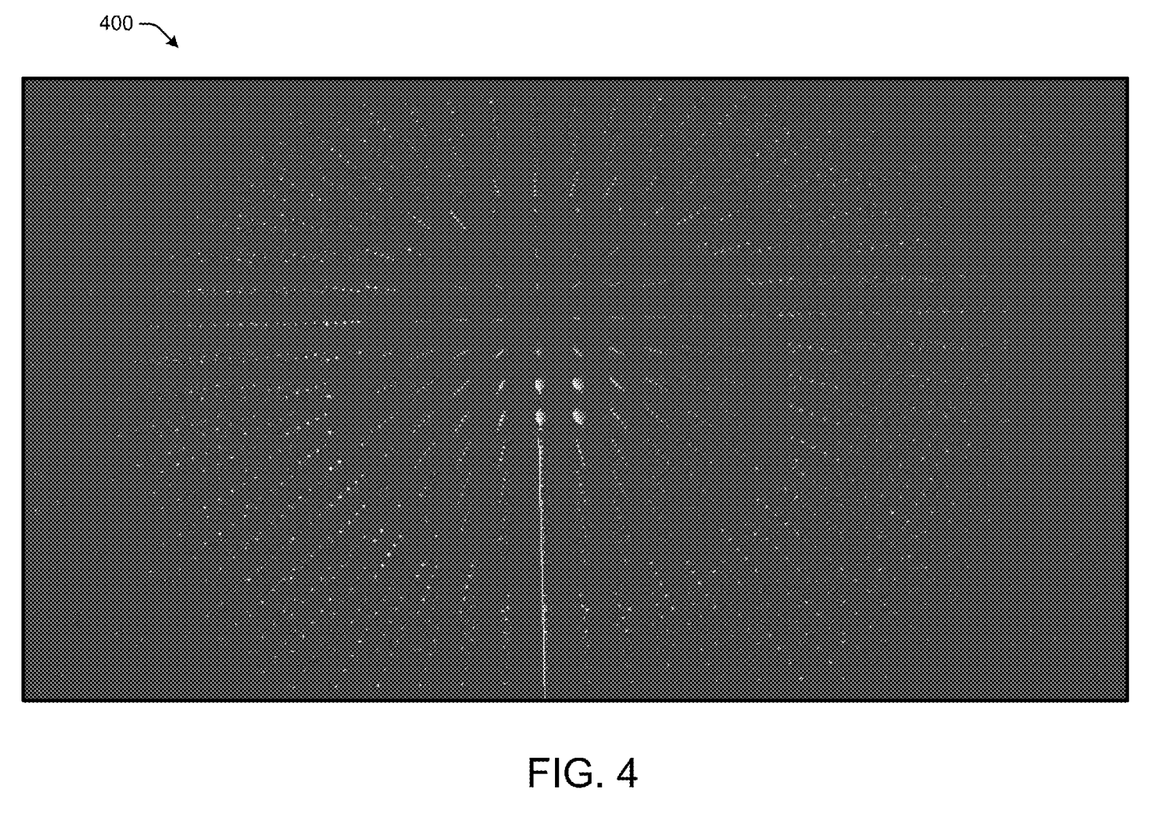
FIG. 4 is a schematic diagram showing an example of a grid representing the propagation of energy through a three-dimensional space.

FIG. 4 is a schematic diagram 400 showing an example of a grid representing the propagation of energy through a three-dimensional space. As seen in FIG. 4, the sphere-like representation of energy at the center of the grid appears stronger than the sphere like representation of the energy at the edges of the grid. Thus, a source of energy in the grid is likely at the center of the grid. Consequently, the grid could correspond to the physical, real-world scene 302 of FIG. 3, in which the source of sound energy is the mouth of user 106B.

Example Processes

The processes described in FIGS. 5 and 6 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
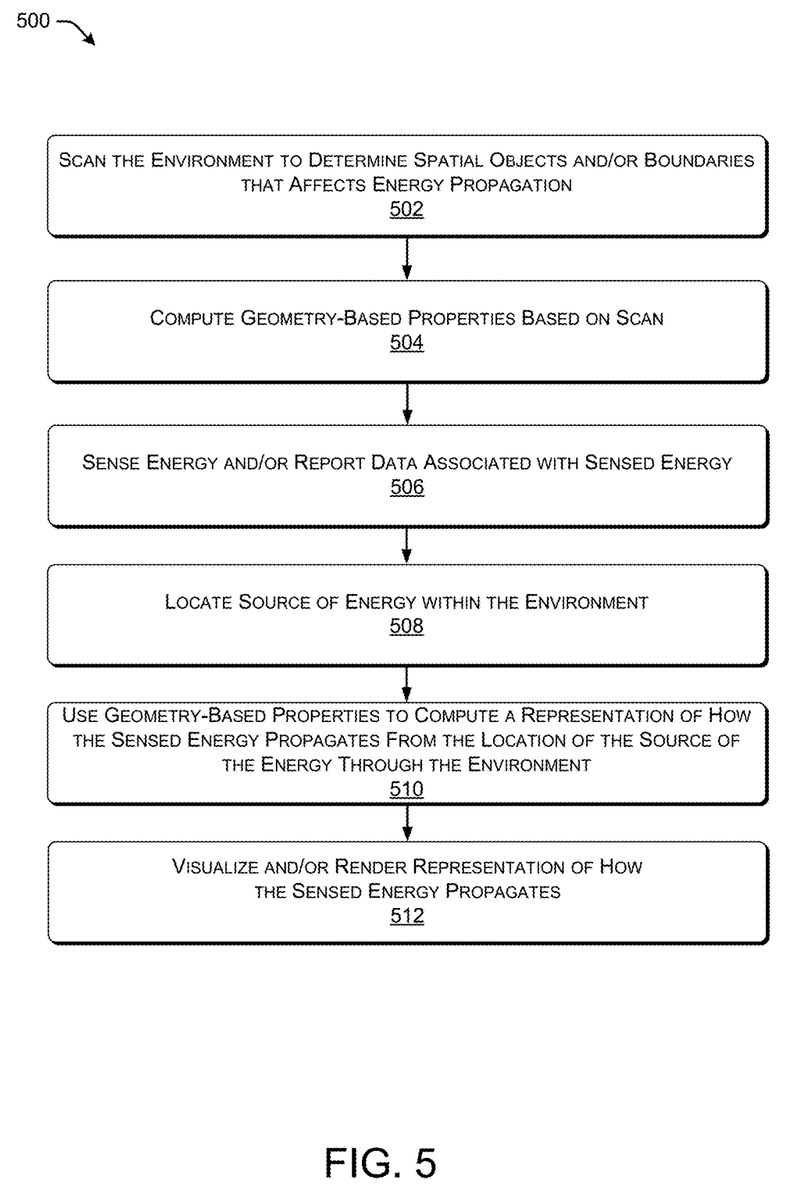
FIG. 5 is a flow diagram that illustrates an example process to determine a representation of how sensed energy propagates from a location of a source through the physical, real-world environment and to visualize the representation.

FIG. 5 is a flow diagram that illustrates an example process 500 to determine a representation of how sensed energy propagates from a location of a source through the physical, real-world environment and to visualize the representation. The process can be implemented by one or more of the servers, devices, and/or sensors, as discussed above with respect to any one of FIGS. 1-3.

At 502, an environment is scanned to determine spatial objects and/or boundaries that affect the propagation of energy within the environment. For example, sensors positioned throughout the environment can be instructed to scan the environment for geometry data and report the data to the input module 116 (e.g., the input module 116 receives the geometry data from the sensors).

At 504, geometry-based properties are computed based on the data captured via the scan. For example, the geometry module 118 can compute parameter fields which encode scene level properties such as one or more of a loudness map (e.g., for sound propagation), a reflection map to model how energy is redirected in response to encountering a real or a virtual object, a reverberation map to model how repeated energy (e.g., an echo) propagates, an amount of time it takes energy to travel from a source location (e.g., a first three-dimensional point) in the environment to another three-dimensional point within the real scene, etc.

At 506, energy is sensed and/or data associated with the sensed energy is reported. For example, sensors positioned throughout the environment can be configured to monitor for energy and report data associated with the detected energy to the input module 116 (e.g., the input module 116 receives the energy data from the sensors). In some instances, the scan discussed above with respect to 504 can be implemented in response to energy being detected.

At 508, a source of the energy is located. For example, triangulation can be used to locate a source of sound or other energy.

At 510, the geometry-based properties are used to compute a representation of how the sensed energy propagates from the location of the source of the energy through the environment.

For example, a finite-difference wave equation simulator can be used to compute the representation. If a detected energy source is located at some position, $x_0$, the signal at the source at a particular time can be represented by $(x_0, t)$. A propagation model can provide properties of the propagation of energy at a three-dimensional point (e.g., any and/or every point) in space due to the source, which can be represented as $A(x, x_0)$. If the time-delay for propagation is $\tau(x, x_0)$, a geodesic path delay around scene geometry can be represented as $\tau(x, x_0)=g(x, x_0)/c$ or a line of sight can be represented as $\tau(x, x_0)=|x-x_0|/c$. Then, the following function can be computed: $Color(x, t)=R(s(x_0,t-\tau(x, x_0)), A(x, x_0))$. Here R is a function that combines the temporal, time-delayed source signal that arrives at the point and the propagation characteristics at that point.

In some examples, the energy module 120 can divide a three-dimensional space (e.g., the room of FIG. 3) in which energy propagates into an occupancy grid (e.g., the 3-D space is discretized into an array). The occupancy grid can describe a history of vector fields. Each element of the occupancy grid can be associated with historical properties that describe the propagation of energy that entered the system at different time instants. Thus, for an individual occupancy grid, data associated with properties of energy (e.g., intensity, direction, frequency represented by color, etc.) that entered the system at various times (e.g., t, t−1, t−2, and so forth) can be maintained. Accordingly, for a computation cycle, the following steps of an example algorithm can occur:

1. Introduce detected energy: From the detected energy source location, the surrounding voxels in the occupancy grid can be assigned seed values, for example, an initial vector (intensity+direction) and color representing frequency.
2. Propagating energy:
    a. Update step: For each past time instant and for each voxel in the occupancy grid, a new vector and color can be calculated as a sum of contributions of the vectors and colors of the neighboring voxels from a previous time instant. This can also take into account the latest parameter fields to modulate the propagating energy. For example:
        i. Vector (x, y, z, t)=(vector sum of neighboring vector field from time t−1)*modulation by latest parameter field
        ii. Color (x, y, z, t)=Original Color*step function (vector amplitude)
    b. Summing contributions: At each voxel, a sum of the contributions of the vector field and color for each time instant can be calculated and this can provide, for example, a radius of a sphere based on an amount of intensity at a particular voxel location and a color of the sphere at a particular voxel location.

At 512, the representation is virtualized and/or rendered for display so a user can view invisible energy, for example, in a mixed reality scene. For instance, rendering data can be sent by server(s) 110 to a mixed reality device 200 associated with a user so the rendering module 130 can render the representation to be displayed as virtual content (e.g., the representation overlays a real-world view of the user).

In various examples, operations 506 through 512 can be repeated if another energy from another source is detected in the environment (e.g., a person talking and a dog barking). In some instances, the detected energies in an environment can be of different types (e.g., sound, heat, light, radiation, electro-magnetic field, etc.). Thus, different energies can be rendered differently so a user, while viewing, can distinguish between them (e.g., a first energy can be represented by a set of spheres while a second energy can be represented by a set of squares).

Figure 6:
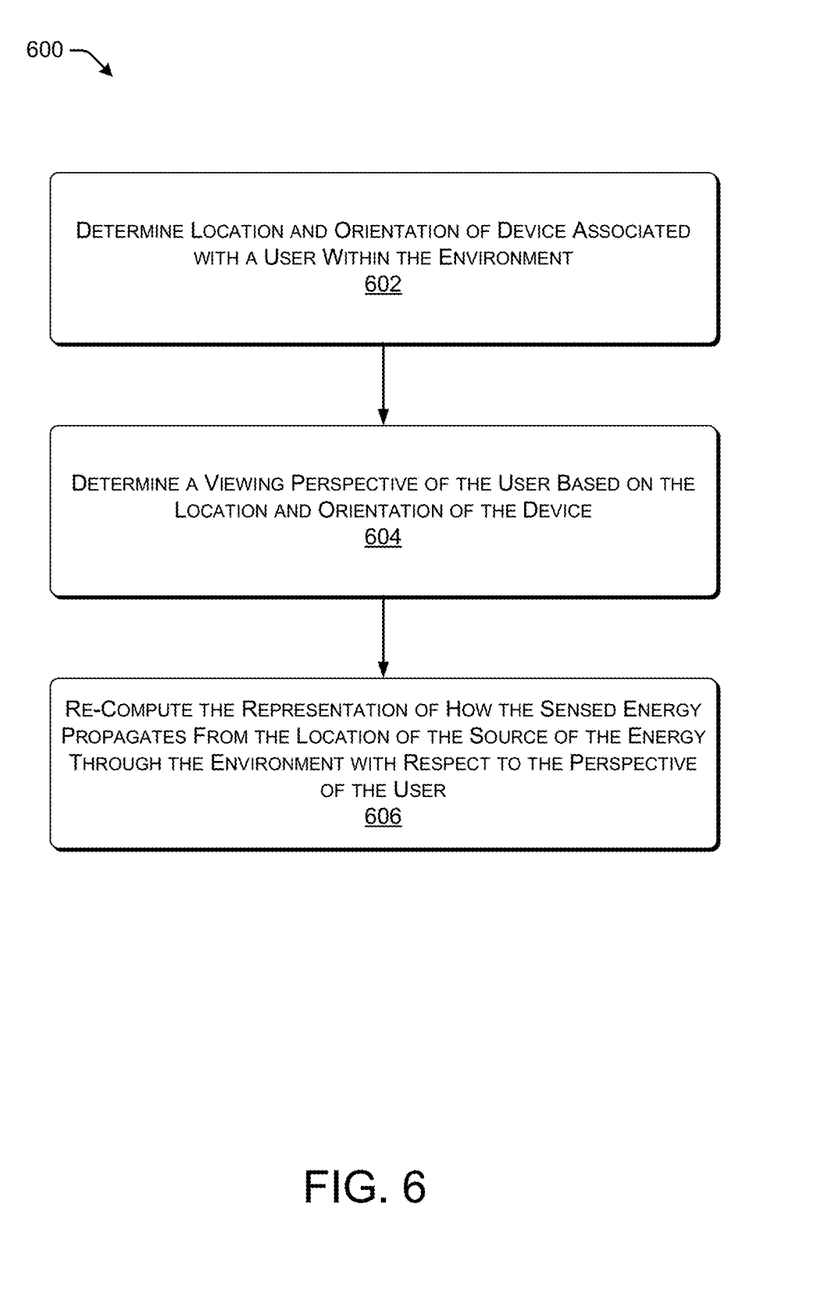
FIG. 6 is a flow diagram that illustrates an example process to re-compute the representation of how the sensed energy propagates from the location of the source of the energy through the environment based on a viewing perspective of a user.

FIG. 6 is a flow diagram that illustrates an example process 600 that re-computes the representation of how the sensed energy propagates from the location of the source of the energy through the environment based on a viewing perspective of a user. The process can be implemented by one or more of the servers, devices, and/or sensors, as discussed above with respect to any one of FIGS. 1-3.

At 602, a location and an orientation of a device associated with a user (e.g., a mixed reality device) located in the environment is determined. For example, the geometry module 118 can determine that a device of a first user (e.g., user 106A from FIG. 3) is located directly in front of a second user (e.g., user 106B in FIG. 3) and that the device is directed so that it is facing the second user.

At 604, a viewing perspective of the user is determined based on the location and the orientation of the device. For instance, the viewing perspective in FIG. 3 is looking at user 106B instead of looking away from user 106B.

At 606, the representation of how the sensed energy propagates from the location of the source of the energy through the environment is re-computed based on the viewing perspective of the user. For example, user 106A, being located directly in front of user 106B in FIG. 3 views a different representation than another user (e.g., user 106C) that is located behind user 106B. That is, user 106A may visualize a stronger representation of the voice of user 106B compared to the representation visualized by user 106C, since user 106B is facing and talking to user 106A and not user 106C.

Example Clauses

Example A, a system comprising: one or more processors; memory; and one or more modules stored in the memory and executable by the one or more processors to perform operations comprising: receiving first data associated with real objects and boundaries that affect the propagation of energy within the environment; computing, based at least in part on the received first data, geometry-based properties; receiving second data associated with energy in the environment; locating, based at least in part on the received second data, a source of the energy within the environment; using the geometry-based properties to compute a representation of how the energy propagates from a location of the source of the energy through the environment; and causing the representation of how the energy propagates from the location of the source of the energy through the environment to be rendered on a display.

Example B, the system as Example A recites, wherein the display is part of, or coupled to a mixed reality device, and the display comprises a transparent display.

Example C, the system as Example A or Example B recites, wherein the representation comprises a set of spheres distributed throughout the environment and a radius of an individual sphere is determined based on an intensity of the energy at a particular three-dimensional location within the environment.

Example D, the system as Example C recites, wherein a first sphere in the set of spheres has a first radius that is greater than a second radius of a second sphere in the set of spheres, the first sphere being closer to the source of the energy than the second sphere.

Example E, the system as any one of Example A through Example D recites, wherein the representation comprises a set of spheres distributed throughout the environment and a color of an individual sphere is determined based on a frequency of the energy at a particular three-dimensional location within the environment.

Example F, the system as any one of Example A through Example E recites, wherein the geometry-based properties comprise at least one of: a loudness map for sound propagation; a reflection map to model how the energy is redirected in response to encountering a real or a virtual object; a reverberation map to model how repeated energy propagates; or an amount of time it takes energy to travel from a source location to another three-dimensional point within the environment.

Example G, the system as any one of Example A through Example F recites, the operations further comprising: receiving third data associated with another energy in the environment; locating, based at least in part on the received third data, another source of the other energy within the environment; using the geometry-based properties to compute another representation of how the other energy propagates from a location of the other source of the other energy through the environment; and causing the other representation of how the other energy propagates from the location of the other source of the other energy through the environment to be rendered on the display simultaneously with the representation of how the energy propagates from the location of the source of the energy through the environment.

Example H, the system as any one of Example A through Example G recites, determining a location and an orientation of a mixed reality device associated with a user in the environment; determining a viewing perspective of the user based at least in part on the location and the orientation of the mixed reality device; and using the geometry-based properties to re-compute the representation of how the energy propagates from the location of the source of the energy through the environment based at least in part on the viewing perspective of the user.

Example I, the system as any one of Example A through Example H recites, wherein the energy is associated with one of: sound; a Wi-Fi signal; heat; light; fluid dynamics; an electro-magnetic field; radiation; or an air current, While Example A through Example I are described above with respect to a system, it is understood in the context of this document that the content of Example A through Example I may also be implemented via a device, computer storage media, and/or a method.

Example J, a method comprising: receiving first data associated with real objects and boundaries that affect the propagation of energy within the environment; computing, by one or more processors and based at least in part on the received first data, geometry-based properties; receiving second data associated with energy in the environment; locating, based at least in part on the received second data, a source of the energy within the environment; using the geometry-based properties to compute a representation of how the energy propagates from a location of the source of the energy through the environment; and causing the representation of how the energy propagates from the location of the source of the energy through the environment to be rendered on a display.

Example K, the method as Example J recites, wherein the display is part of, or coupled to a mixed reality device, and the display comprises a transparent display.

Example L, the method as Example J or Example K recites, wherein the representation comprises a set of spheres distributed throughout the environment and a radius of an individual sphere is determined based on an intensity of the energy at a particular three-dimensional location within the environment.

Example M, the method as Example L recites, wherein a first sphere in the set of spheres has a first radius that is greater than a second radius of a second sphere in the set of spheres, the first sphere being closer to the source of the energy than the second sphere.

Example N, the method as any one of Example J through Example M recites, wherein the representation comprises a set of spheres distributed throughout the environment and a color of an individual sphere is determined based on a frequency of the energy at a particular three-dimensional location within the environment.

Example O, the method as any one of Example J through Example N recites, wherein the geometry-based properties comprise at least one of: a loudness map for sound propagation; a reflection map to model how the energy is redirected in response to encountering a real or a virtual object; a reverberation map to model how repeated energy propagates; or an amount of time it takes energy to travel from a source location to another three-dimensional point within the environment.

Example P, the method as any one of Example J through Example O recites, further comprising: determining a location and an orientation of a mixed reality device associated with a user in the environment; determining a viewing perspective of the user based at least in part on the location and the orientation of the mixed reality device; and using the geometry-based properties to re-compute the representation of how the energy propagates from the location of the source of the energy through the environment based at least in part on the viewing perspective of the user.

Example Q, a system configured to communicate with a mixed reality device located within a real-world scene, the system comprising: one or more sensors; one or more processors; and memory storing instructions that, when executed on the one or more processors, cause the system to perform operations comprising: scanning, using the one or more sensors, the real-world scene to obtain first data associated with real objects that affect the propagation of energy within the real-world scene; computing, based at least in part on the obtained first data, geometry-based properties of the real-world scene; detecting, using the one or more sensors, second data associated with energy in the real-world scene; locating, based at least in part on the detected second data, a source of the energy within the real-world scene; using the geometry-based properties to compute a representation of how the energy propagates from a location of the source of the energy through the real-world scene; generating rendering data for the representation of how the energy propagates from the location of the source of the energy through the real-world scene; and sending the rendering data to a mixed reality device to be rendered as virtual content in association with a view of the real-world scene.

Example R, the system as Example Q recites, wherein the representation comprises a set of spheres distributed over the real-world scene and a radius of an individual sphere is determined based on an intensity of the energy at a particular three-dimensional location within the real-world scene.

Example S, the system Example R recites, wherein a first sphere in the set of spheres has a first radius that is greater than a second radius of a second sphere in the set of spheres, the first sphere being closer to the source of the energy than the second sphere.

Example T, the system as any one of Example Q through Example S recites, wherein the representation comprises a set of spheres distributed over the real-world scene and a color of an individual sphere is determined based on a frequency of the energy at a particular three-dimensional location within the real-world scene.

While Example Q through Example T are described above with respect to a system, it is understood in the context of this document that the content of Example Q through Example T may also be implemented via a method, computer storage media, and/or a device.

Example U, a system comprising: means for receiving first data associated with real objects and boundaries that affect the propagation of energy within the environment and second data associated with energy in the environment; means for computing, based at least in part on the received first data, geometry-based properties; means for locating, based at least in part on the received second data, a source of the energy within the environment; means for using the geometry-based properties to compute a representation of how the energy propagates from a location of the source of the energy through the environment; and means for causing the representation of how the energy propagates from the location of the source of the energy through the environment to be rendered on a display.

Example V, a system configured to communicate with a mixed reality device located within a real-world scene, the system comprising: means for scanning the real-world scene to obtain first data associated with real objects that affect the propagation of energy within the real-world scene; means for computing, based at least in part on the obtained first data, geometry-based properties of the real-world scene; means for detecting second data associated with energy in the real-world scene; means for locating, based at least in part on the detected second data, a source of the energy within the real-world scene; means for using the geometry-based properties to compute a representation of how the energy propagates from a location of the source of the energy through the real-world scene; means for generating rendering data for the representation of how the energy propagates from the location of the source of the energy through the real-world scene; and means for sending the rendering data to a mixed reality device to be rendered as virtual content in association with a view of the real-world scene.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," or "might," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system comprising:
one or more processors;
memory; and
one or more modules stored in the memory and executable by the one or more processors to perform operations comprising:
receiving first data associated with real objects and boundaries that affect the propagation of energy within an environment in which a user is present;
computing, based at least in part on the received first data, geometry-based properties, wherein the geometry-based properties comprise a reflection map to model how the energy is redirected in response to encountering a real or a virtual object;
receiving second data associated with energy in the environment;
locating, based at least in part on the received second data, a source of the energy within the environment;
using the geometry-based properties to compute a representation of how the energy propagates from a location of the source of the energy through the environment; and
causing the representation of how the energy propagates from the location of the source of the energy through the environment to be rendered on a display.

2. The system as claim 1 recites, wherein the display is part of, or coupled to a mixed reality device, and the display comprises a transparent display.

3. The system as claim 1 recites, wherein the representation comprises a set of spheres distributed throughout the environment and a radius of an individual sphere is determined based on an intensity of the energy at a particular three-dimensional location within the environment.

4. The system as claim 3 recites, wherein a first sphere in the set of spheres has a first radius that is greater than a second radius of a second sphere in the set of spheres, the first sphere being closer to the source of the energy than the second sphere.

5. The system as claim 1 recites, wherein the representation comprises a set of spheres distributed throughout the environment and a color of an individual sphere is determined based on the energy at a particular three-dimensional location within the environment belonging to a particular frequency band of a plurality of different frequency bands.

6. The system as claim 1 recites, wherein the geometry-based properties further comprise at least one of:
a loudness map for sound propagation; or
a reverberation map to model how repeated energy propagates.

7. The system as claim 1 recites, the operations further comprising:
receiving third data associated with another energy in the environment;
locating, based at least in part on the received third data, another source of the other energy within the environment;
using the geometry-based properties to compute another representation of how the other energy propagates from a location of the other source of the other energy through the environment; and
causing the other representation of how the other energy propagates from the location of the other source of the other energy through the environment to be rendered on the display simultaneously with the representation of how the energy propagates from the location of the source of the energy through the environment.

8. The system as claim 1 recites, the operations further comprising:
determining a location and an orientation of a mixed reality device associated with the user in the environment;
determining a viewing perspective of the user based at least in part on the location and the orientation of the mixed reality device; and
using the geometry-based properties to re-compute the representation of how the energy propagates from the location of the source of the energy through the environment based at least in part on the viewing perspective of the user.

9. The system as claim 1 recites, wherein the energy is associated with one of:
sound;
a Wi-Fi signal;
heat;
light;
fluid dynamics;
an electro-magnetic field;
radiation; or
an air current.

10. A method comprising:
receiving first data associated with real objects and boundaries that affect propagation of energy within an environment in which a user is present;
computing, by one or more processors and based at least in part on the received first data, geometry-based properties, wherein the geometry-based properties comprise a loudness map for sound propagation;
receiving second data associated with energy in the environment;
locating, based at least in part on the received second data, a source of the energy within the environment;
using the geometry-based properties to compute a representation of how the energy propagates from a location of the source of the energy through the environment; and
causing the representation of how the energy propagates from the location of the source of the energy through the environment to be rendered on a display.

11. The method as claim 10 recites, wherein the display is part of, or coupled to a mixed reality device, and the display comprises a transparent display.

12. The method as claim 10 recites, wherein the representation comprises a set of spheres distributed throughout the environment and a radius of an individual sphere is determined based on an intensity of the energy at a particular three-dimensional location within the environment.

13. The method as claim 12 recites, wherein a first sphere in the set of spheres has a first radius that is greater than a second radius of a second sphere in the set of spheres, the first sphere being closer to the source of the energy than the second sphere.

14. The method as claim 10 recites, wherein the representation comprises a set of spheres distributed throughout the environment and a color of an individual sphere is determined based on the energy at a particular three-dimensional location within the environment belonging to a particular frequency band of a plurality of different frequency bands.

15. The method as claim 10 recites, wherein the geometry-based properties further comprise at least one of:
a reflection map to model how the energy is redirected in response to encountering a real or a virtual object; or a reverberation map to model how repeated energy propagates.

16. The method as claim 10 recites, further comprising:
determining a location and an orientation of a mixed reality device associated with the user in the environment;
determining a viewing perspective of the user based at least in part on the location and the orientation of the mixed reality device; and
using the geometry-based properties to re-compute the representation of how the energy propagates from the location of the source of the energy through the environment based at least in part on the viewing perspective of the user.

17. A system configured to communicate with a mixed reality device located within a real-world scene, the system comprising:
one or more sensors;
one or more processors; and
memory storing instructions that, when executed on the one or more processors, cause the system to perform operations comprising:
scanning, using the one or more sensors, the real-world scene to obtain first data associated with real objects that affect the propagation of energy within the real-world scene in which a user is present;
computing, based at least in part on the obtained first data, geometry-based properties of the real-world scene, wherein the geometry-based properties comprise a reverberation map to model how repeated energy propagates;
detecting, using the one or more sensors, second data associated with energy in the real-world scene;
locating, based at least in part on the detected second data, a source of the energy within the real-world scene;
using the geometry-based properties to compute a representation of how the energy propagates from a location of the source of the energy through the real-world scene;
generating rendering data for the representation of how the energy propagates from the location of the source of the energy through the real-world scene; and
sending the rendering data to a mixed reality device to be rendered as virtual content in association with a view of the real-world scene.

18. The system as claim 17 recites, wherein the representation comprises a set of spheres distributed over the real-world scene and a radius of an individual sphere is determined based on an intensity of the energy at a particular three-dimensional location within the real-world scene.

19. The system as claim 18 recites, wherein a first sphere in the set of spheres has a first radius that is greater than a second radius of a second sphere in the set of spheres, the first sphere being closer to the source of the energy than the second sphere.

20. The system as claim 17 recites, wherein the representation comprises a set of spheres distributed over the real-world scene and a color of an individual sphere is determined based on the energy at a particular three-dimensional location within the real-world scene belonging to a particular frequency band of a plurality of different frequency bands.

* * * * *